(12) United States Patent
Van Amstel et al.

(10) Patent No.: US 9,326,449 B2
(45) Date of Patent: May 3, 2016

(54) BINDING APPARATUS AND METHOD FOR BINDING A BALE

(75) Inventors: Leonardus Hendirkus Maria Van Amstel, Geldrop (NL); Henricus Petrus Gerardus Bullens, Casteren (NL)

(73) Assignee: KUHN-GELDROP B.V., Geldrop (NL)

( * ) Notice: Subject to any disclaimer, the term of this patent is extended or adjusted under 35 U.S.C. 154(b) by 1007 days.

(21) Appl. No.: 13/511,994

(22) PCT Filed: Nov. 23, 2010

(86) PCT No.: PCT/IB2010/003539
§ 371 (c)(1),
(2), (4) Date: Jan. 15, 2013

(87) PCT Pub. No.: WO2011/067681
PCT Pub. Date: Jun. 9, 2011

(65) Prior Publication Data
US 2013/0104754 A1  May 2, 2013

(30) Foreign Application Priority Data

Dec. 1, 2009 (GB) .................................. 0921067.5

(51) Int. Cl.
*A01F 15/07* (2006.01)

(52) U.S. Cl.
CPC ............... *A01F 15/071* (2013.01); *A01F 15/07* (2013.01); *A01F 15/0715* (2013.01); *A01F 2015/0725* (2013.01)

(58) Field of Classification Search
CPC ... A01F 15/07; A01F 15/071; A01F 15/0715; A01F 2015/072; A01F 2015/0725; A01F 2015/0735; A01F 2015/0745; B65B 11/006; B65B 11/04; B65B 11/045; B65B 11/58; B65B 2011/002; B65B 11/025; B65B 2210/20
USPC .................... 53/399, 441, 465, 556, 587, 211
See application file for complete search history.

(56) References Cited

U.S. PATENT DOCUMENTS

| | | | | |
|---|---|---|---|---|
| 1,351,809 A | * | 9/1920 | Sutherland | B65B 25/148 53/211 |
| 3,793,798 A | * | 2/1974 | Lancaster, III | B65B 11/025 53/465 |
| 4,144,696 A | * | 3/1979 | Gustavsson | B65B 11/04 53/587 |

(Continued)

FOREIGN PATENT DOCUMENTS

| EP | 1 321 028 A1 | 6/2003 |
|---|---|---|
| EP | 1 606 991 A1 | 12/2005 |

(Continued)

OTHER PUBLICATIONS

International Search Report issued in PCT/IB2010/003539 on Jul. 28, 2011, 4 pages.

(Continued)

*Primary Examiner* — Stephen F Gerrity
(74) *Attorney, Agent, or Firm* — Knobbe Martens Olson & Bear LLP

(57) ABSTRACT

A binding apparatus for a baling machine includes a dispensing mechanism for dispensing at least two strips of binding film and guiding the strips of film simultaneously onto the surface of a rotating bale. The dispensing mechanism lays the strips of film side-by-side on the bale surface to form a combined strip having a width greater than the width H of each individual strip of binding film.

27 Claims, 16 Drawing Sheets

(56) References Cited

U.S. PATENT DOCUMENTS

| | | | |
|---|---|---|---|
| 4,409,776 A * | 10/1983 | Usui | B65B 11/045 53/211 |
| 4,807,427 A | 2/1989 | Casteel et al. | |
| 5,079,898 A * | 1/1992 | Springs | A01F 15/0715 53/399 |
| 5,385,001 A | 1/1995 | Ramer | |
| 5,447,008 A * | 9/1995 | Martin-Cocher | B65B 11/045 53/399 |
| 5,447,009 A | 9/1995 | Oleksy et al. | |
| 6,446,804 B1 * | 9/2002 | Lehtineva | B65B 11/58 206/394 |
| 6,971,220 B1 | 12/2005 | Rampp | |
| 2004/0055268 A1 | 3/2004 | Schuster | |
| 2009/0277136 A1 * | 11/2009 | Van Amstel et al. | A01F 15/071 53/441 |
| 2011/0088359 A1 * | 4/2011 | Brocard | B65B 11/006 53/461 |

FOREIGN PATENT DOCUMENTS

| | | | |
|---|---|---|---|
| EP | 1 803 345 | 7/2007 | |
| EP | 1872648 A1 * | 1/2008 | .......... A01F 15/0715 |
| GB | 2134068 A | 8/1984 | |
| GB | 2241484 A | 9/1991 | |
| JP | 04327108 A * | 11/1992 | |
| WO | WO 9207761 A1 * | 5/1992 | ............ B65B 11/006 |
| WO | WO 01/58677 A1 | 8/2001 | |

OTHER PUBLICATIONS

Search Report issued in Great Britain Application No. 0921067.5 on Mar. 17, 2010, 2 pages.

* cited by examiner

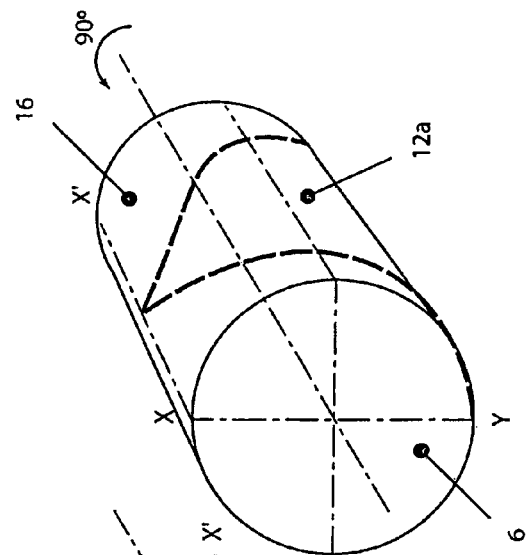
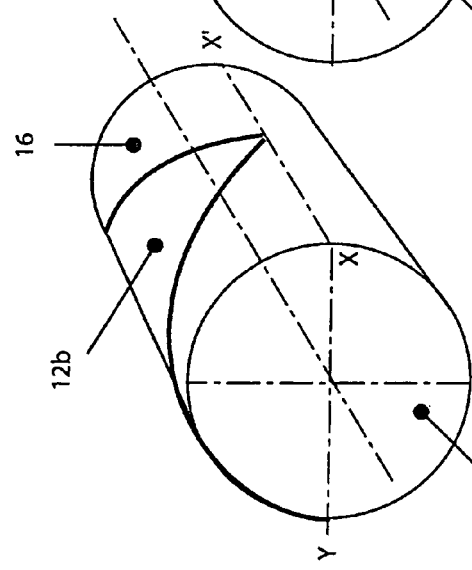
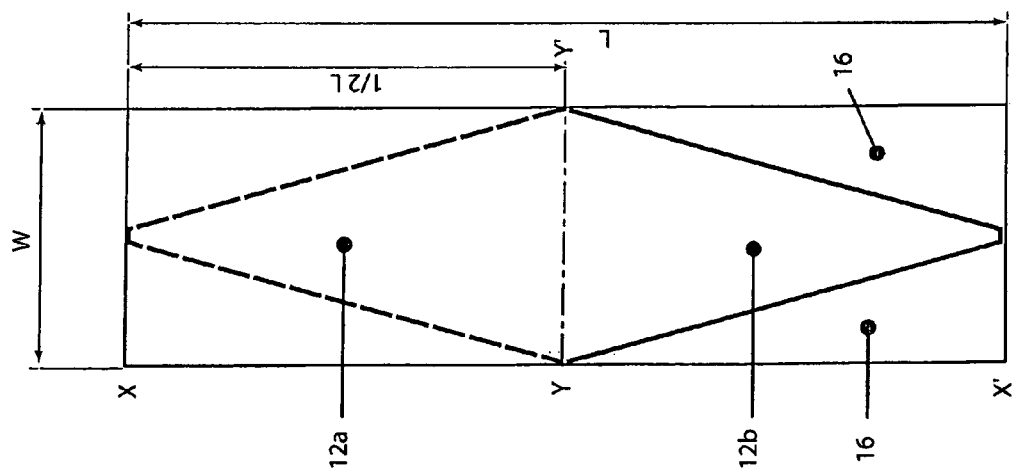
Fig. 1d
Fig. 1c
Fig. 1b
PRIOR ART

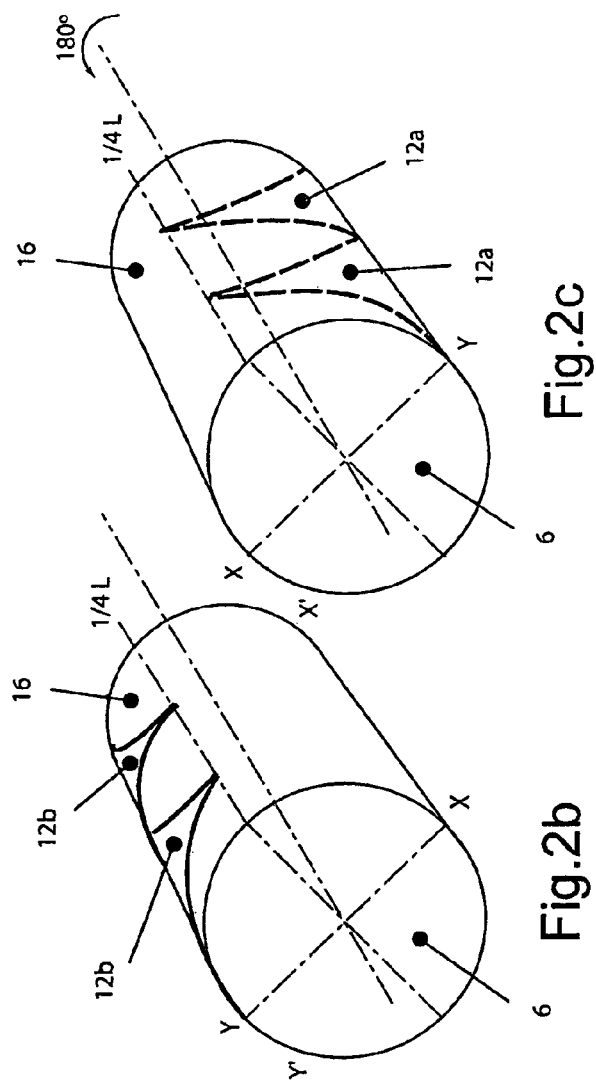
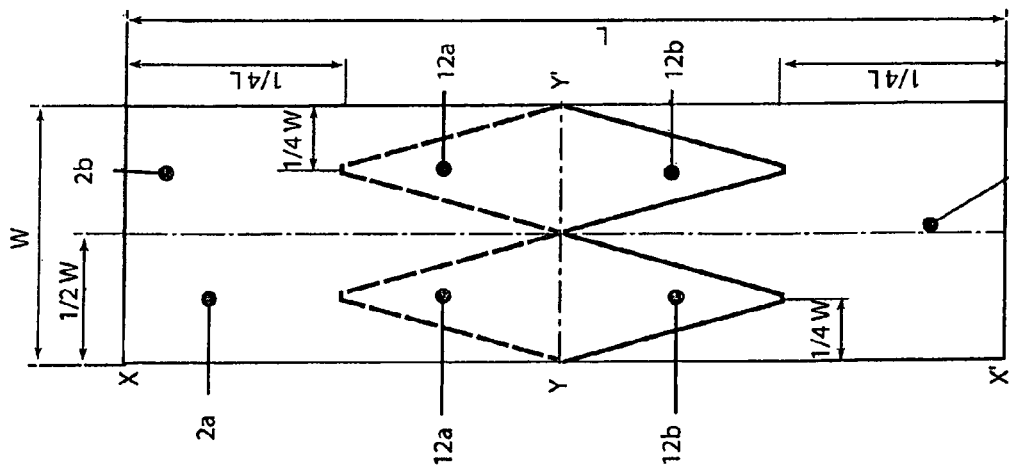
Fig.2c  Fig.2b  Fig.2a

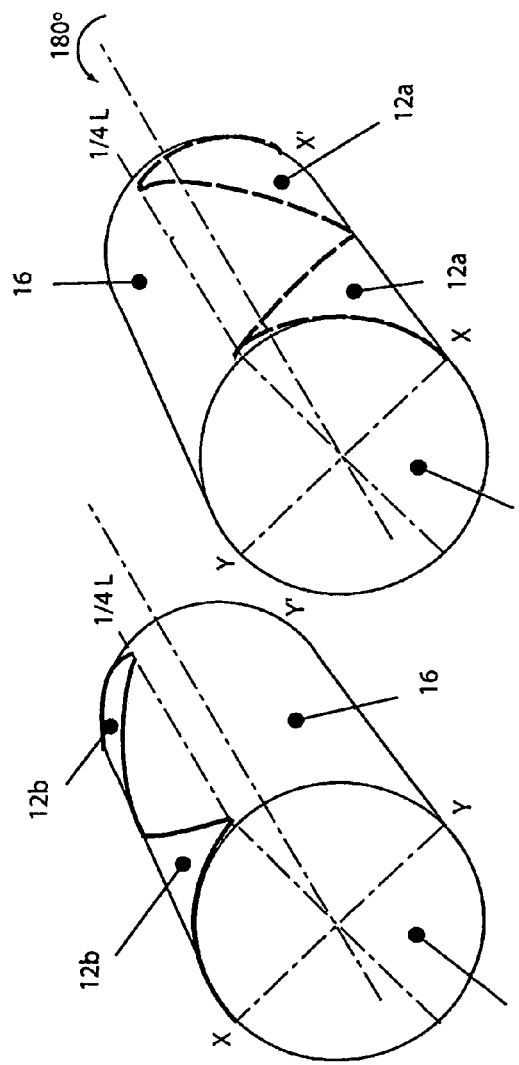
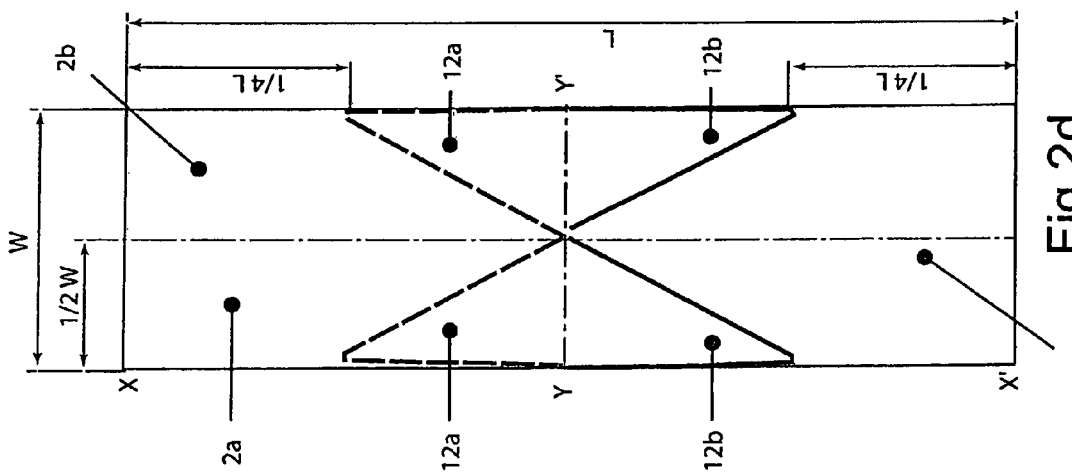

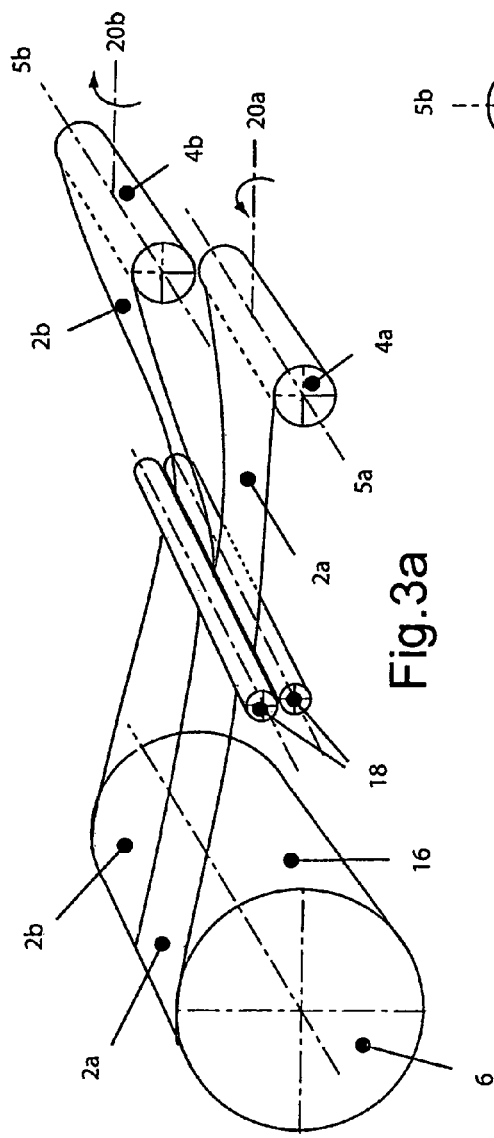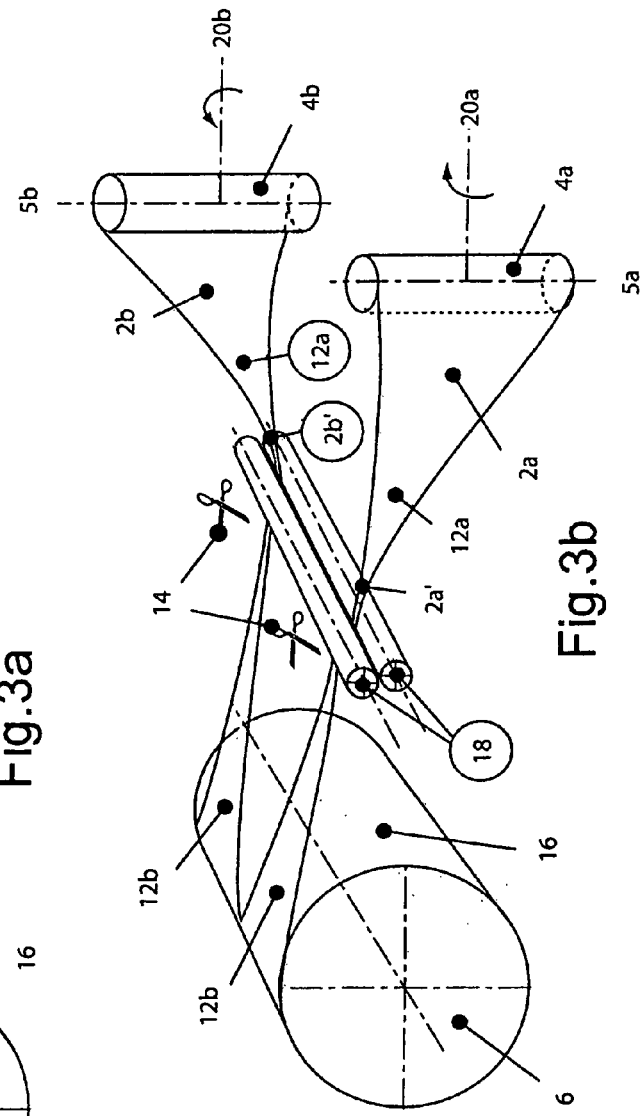

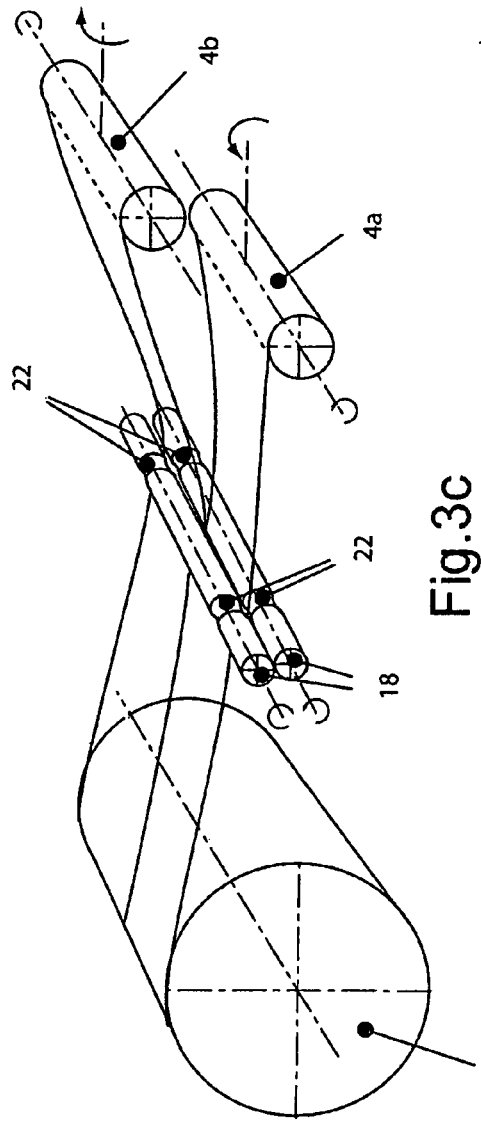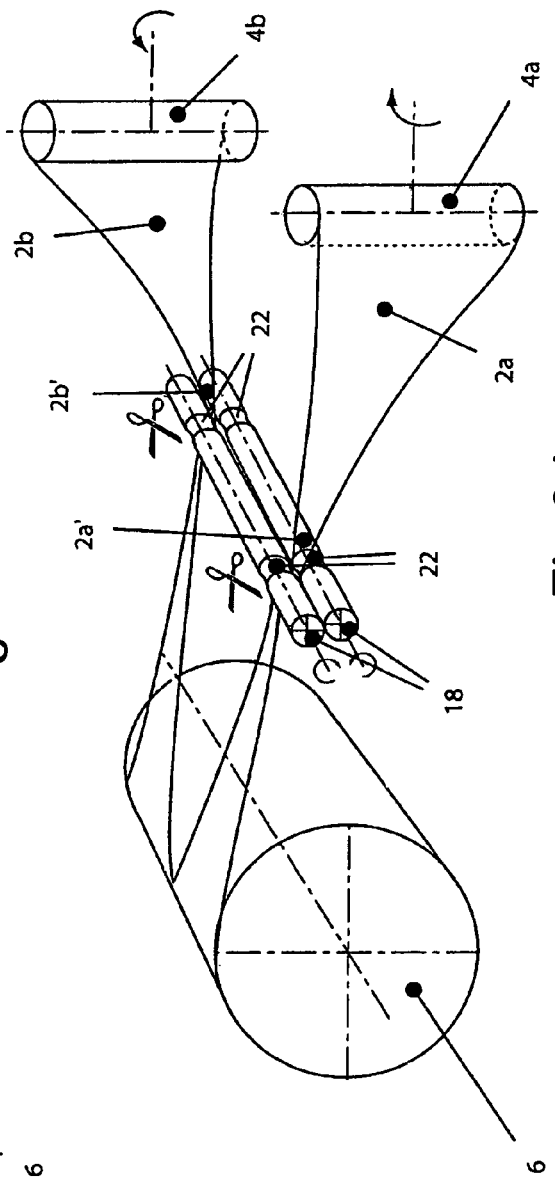

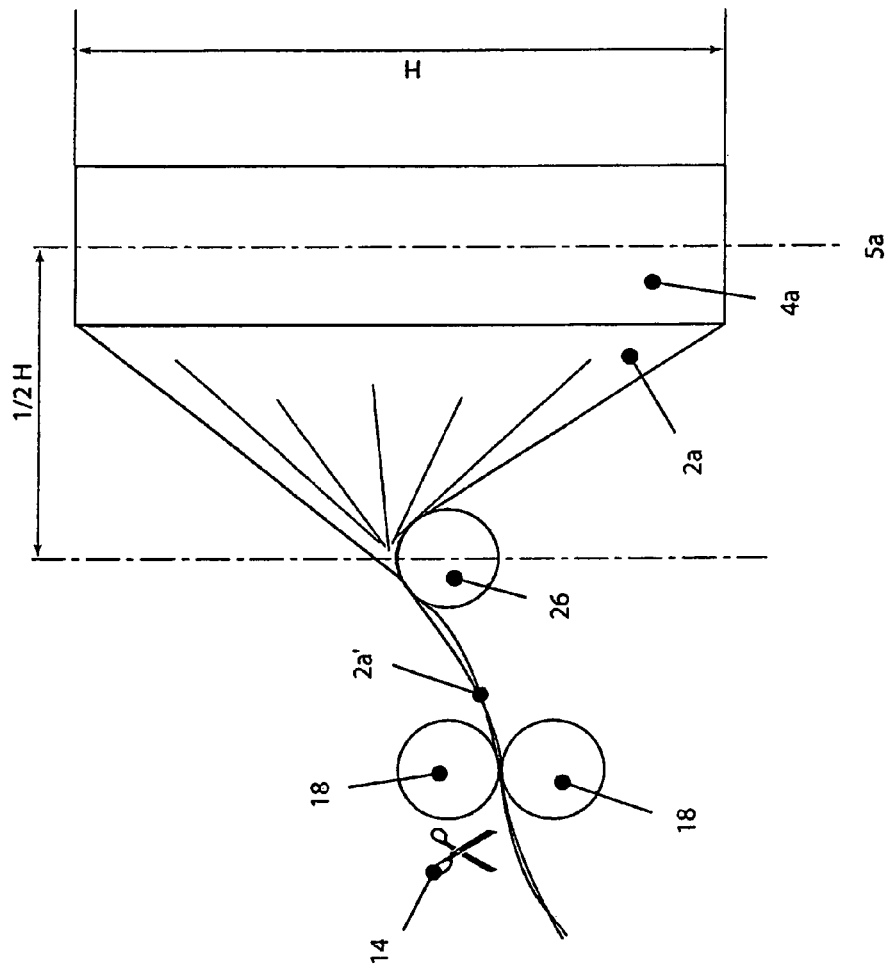

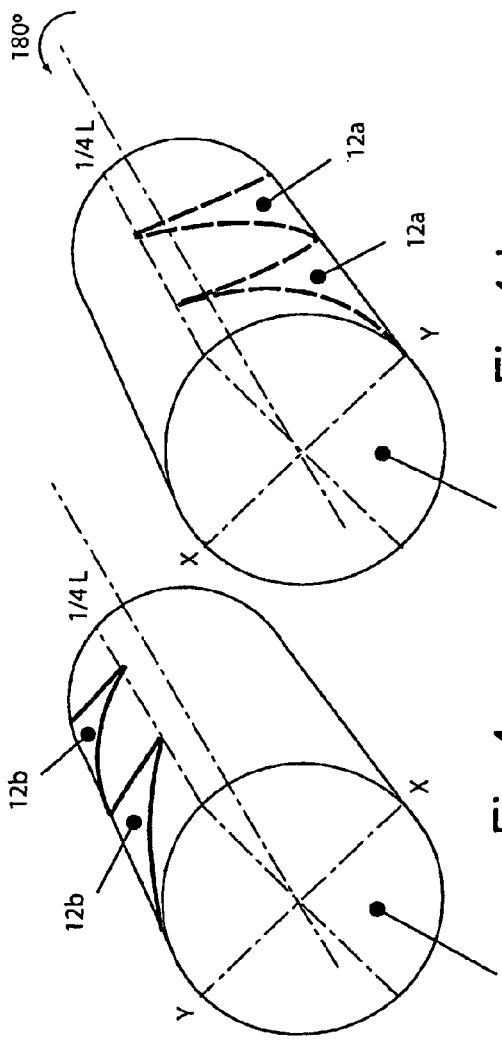
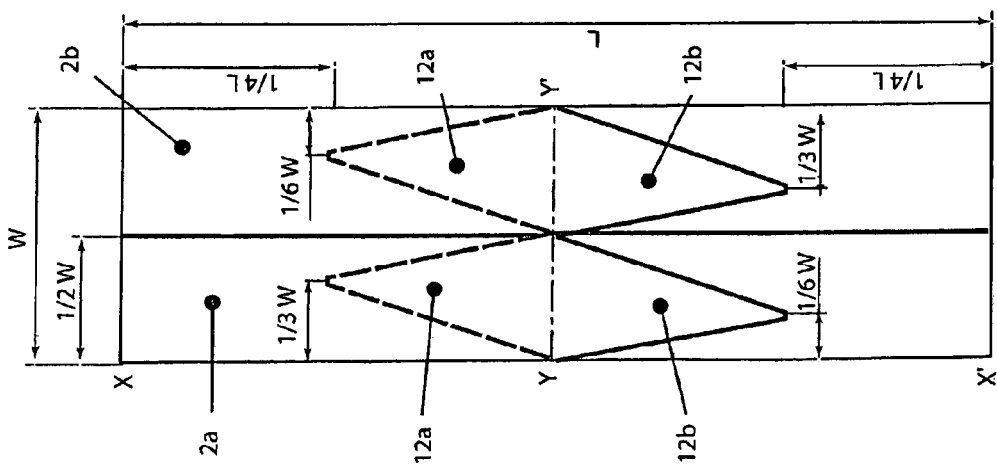

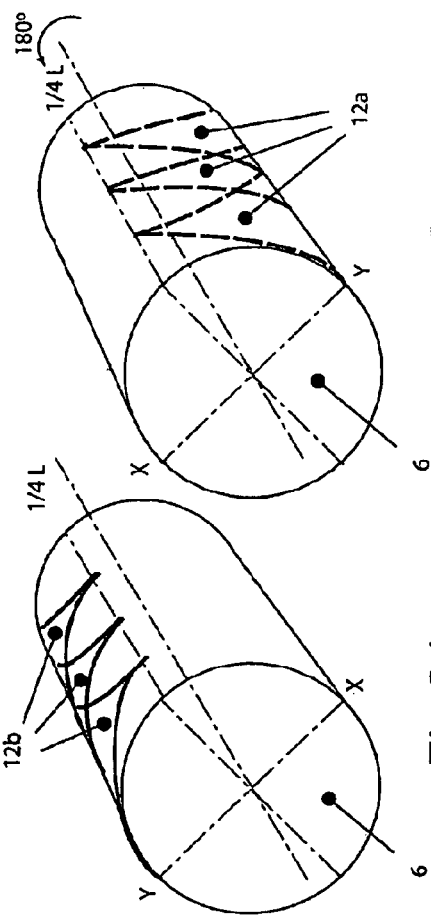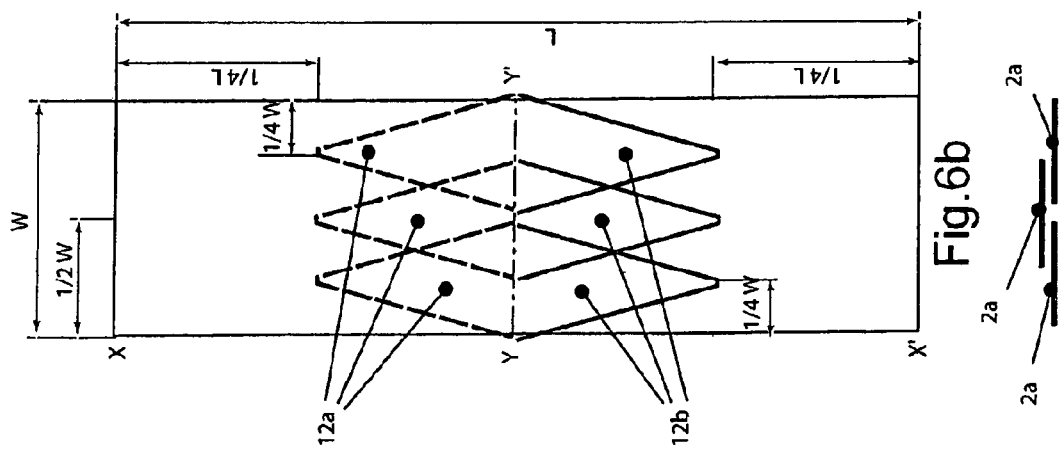

BINDING APPARATUS AND METHOD FOR BINDING A BALE

RELATED APPLICATIONS

This application is the U.S. National Phase filing under 35 U.S.C. §371 of PCT/IB2010/003539, filed Nov. 23, 2010, which designated the United States and was published in English, which claims priority under 35 U.S.C. §119(a)-(d) to Great Britain Patent Application No. 0921067.5, filed Dec. 1, 2009, the content of which is incorporated herein by reference in its entirety.

FIELD OF THE INVENTION

The present invention relates to a binding apparatus for a baling machine and a method of binding a bale. In particular, but not exclusively, the invention relates to the binding of round bales of straw, hay or other crops.

BACKGROUND OF THE INVENTION

Round bales are made by introducing cut crop materials into a bale-making chamber of a baling machine and rotating the straw within the chamber using either belts or rollers. As the crop accumulates it is compressed to form a cylindrical bale (commonly referred to as a "round bale"). Various kinds of baling machines are known including both fixed and variable chamber designs, for example, as described in EP 1591004A. The present invention is applicable to all types of round baling machine.

Baling machines (or "balers") generally include some means for applying a binding to the bale after it has been formed, to maintain the compression of the bale material and retain the shape and integrity of the bale after it has been discharged from the baler. Usually, the binding extends around and is attached to the cylindrical surface of the bale. Various binding materials have been used, including twine and plastic netting. Plastic film has also been used, but without great success, as this has some drawbacks. Generally, balers are designed to use just one of these binding materials.

After binding, the bale may optionally be wrapped in plastic film to protect the bale from degradation during storage and/or to encourage the formation of silage (fermented hay). The wrapping film can be applied around just the cylindrical surface of the bale (a partial wrap) or over the full surface of the bale, including the cylindrical surface and the circular end walls (a full wrap). The wrapping can be applied either by a dedicated wrapping machine or a combined baler/wrapper.

One disadvantage of using twine or netting as a binding material, particularly on bales that are subsequently fully wrapped, is that when the bale is being prepare for use, for example as fodder material, the farmer must remove the wrapping and the binding materials separately for recycling. This is difficult and increases the time and effort required to prepare the bale for use.

The problem can be avoided by using plastic film both as the binding material and as the wrapping material. The farmer can then remove both the binding and the wrapping in a single operation and there is no need to separate the materials for recycling. This saves considerable time and effort.

Further, if film is used as the binding material, less film material may subsequently be needed to complete the wrapping process as the bale is already partially wrapped.

A method of wrapping bales with protective film material is described in U.S. Pat. No. 5,079,898 (Indeco). In this method, the film material has a width less than the width of the bale and it is wound onto the cylindrical surface of the bale in a spiral pattern in order to cover the full width of the bale.

U.S. Pat. No. 6,971,220 (RPP) describes another method of wrapping a round bale, in which full width film material is used. The film is twisted into a rope prior to being introduced into the baling chamber.

Both of these methods have a number of problems, including at least some of the following.

In both RPP and Indeco, the leading end of the wrapping film is bundled together before it is fed into the bale chamber, and in RPP it is also twisted to form a rope. This improves handling and feeding of the film and prevents it blowing about in the wind. The trailing end of the film is also bundled to avoid leaving loose flaps of film on the outer surface of the bale. Bundling the film produces "tails" of film material at the start and end of each binding. These tails do not contribute effectively to the binding process and the film material consumed in forming these tails is therefore effectively wasted.

When using full width of film as in RPP, a considerable amount of film is wasted in forming the tails. When using reduced width film (Indeco), the amount of film wasted in forming the tails is reduced. However, in that case the wrapping process takes longer as more turns have to be applied to cover the entire width of the bale with a spiral wrapping pattern. A further problem with film wrapping generally is that the film material is considerably heavier per unit length than either twine or net binding material. The maximum weight of a roll of film material is limited by the fact that they have to be capable of being safely lifted and handled by an individual operator. Therefore, when using full width film as in RPP, the length of the film has to be quite short, with the result that it has to be replaced frequently. When using reduced width film as in Indeco, although the length of film on the roll can be increased, it is also consumed more quickly because more turns have to be applied to the surface of the bale. Therefore, the roll again has to be replaced frequently.

In both Indeco and RPP, the film is bundled using a pair of pivot arms that swing inwards and bring the edges of the film towards the centre, thus forming the tail close to the middle of the bale (between its two ends). The central region of the bale that lies beneath the tails therefore tends to be more compressed than the shoulders of the bale (where the cylindrical surface meets the circular end faces). This is less than ideal, since the shoulders of the bale are more vulnerable to damage during transportation and storage, and therefore require more protection. Further, neither of these prior art methods is capable of providing a binding that extends over the shoulders of the bale and onto the end faces to provide additional protection.

Also, bundling by pushing the edges of film towards the centre does not produce an even "rope" of film: the film is gathered more tightly at the edges than at the centre. The pivot arm mechanisms used in Indeco and RPP are also complex and expensive to manufacture. They also occupy a large space, which makes it difficult to add the mechanism onto an existing net binder machine.

It is an object of the present invention to provide a binding apparatus for a baling machine, and a method of binding a bale, that mitigates one or more of the aforesaid disadvantages.

SUMMARY OF THE INVENTION

According to one aspect of the present invention there is provided a binding apparatus for a baling machine, the apparatus including means for dispensing at least two strips of binding film and guiding the strips of film simultaneously onto the surface of a rotating bale, the dispensing mechanism being constructed and arranged to lay the strips of film side-by-side on the bale surface to form a combined strip having a width greater than the width H of each individual strip of binding film.

It is possible to use film strips that are narrower than the width of the bale, yet still cover the entire width of the bale in a single operation. Because the film is narrower, a greater length can be provided on each supply without increasing the weight of the roll, thus allowing for prolonged operation. The tails of the strips can be shorter, resulting in reduced film wastage. The tails can also be located in different positions to provide a more even coverage on the bale or to provide an increased thickness of film in places where it is needed, for example on the shoulders of the bale.

Although at least two strips of binding film are required, in some circumstances it may be advantageous to use three or more strips.

Advantageously, the combined strip has a width approximately equal to the bale width W. In some case, the combined strip may have a width slightly greater than the bale width: the ends of the film can then be crinkled or folded back to provide additional support for the edges of the bale, or they can be wrapped around the ends of the bale to protect the end faces of the bale.

The binding apparatus preferably includes means for adjusting the position at which at least one strip of binding film is laid on the rotating bale. This allows the overlap between the strips (for example) to be adjusted.

Advantageously, the binding apparatus includes means for bundling each strip of binding film to form a tail having a reduced width. The tail permits the loose end of the film to be fed more easily onto the surface of the rotating bale.

Advantageously, the binding apparatus includes means for adjusting the position at which at least one tail is laid on the rotating bale. The tail can for example be laid near the edges of the bale to support the edges, or the leading end and trailing end tails can be positioned asymmetrically, or in interleaved positions, to provide a more even film thickness.

Preferably, the binding apparatus includes guide means for guiding the delivery of film to the bale and supply means for supplying film to the guide means, and the bundling means includes means for pivoting the plane of the film supplied to the guide means about an axis that is substantially parallel to the feed direction of the film. This arrangement provides a very effective and uniform bundling effect, in which the film folds in upon itself in a concertina fashion.

The binding apparatus preferably includes means for rotating at least one film supply roll about a pivot axis that is substantially parallel to the feed direction of the film. Preferably, the pivot axis is offset from the plane of the film. This causes the feed position of the film strip to shift transversely relative to the bale as the supply roll pivots, and allows the position of the film or the tails of the film to be adjusted.

The guide means may include at least one roller having a rotation axis that is substantially parallel to the rotation axis of the bale. Preferably, the guide means includes at least two counter-rotating rollers, each having a rotation axis that is substantially parallel to the rotation axis of the bale. Advantageously, at least one of the rollers includes a recess for guiding the bundled film.

Advantageously, the guide means is separated from the supply of film material by a distance of approximately half the film width H. We have found that this provides a very good bundling effect.

Alternatively, the bundling means may include guide elements for gathering together the opposed edges of each strip of binding film. The positions of the guide elements are preferably adjustable to control the separation of the edges. Advantageously, the positions of the guide elements are adjustable to control the position at which the strip of binding film is laid on the rotating bale.

Preferably, the binding apparatus includes a pre-stretching device for stretching the film after it is drawn from the supply rolls.

According to another aspect of the present invention there is provided method of binding a bale, the method comprising dispensing at least two strips of binding film and guiding the strips of film simultaneously onto the surface of a rotating bale, the strips of film being laid side-by-side on the bale surface to form a combined strip having a width greater than the width H of each individual strip of binding film.

The combined strip preferably has a width approximately equal to the bale width W.

The method preferably includes adjusting the position at which at least one strip of binding film is laid on the rotating bale.

The method preferably includes bundling each strip of binding film to form a tail having a reduced width.

Advantageously, the method includes adjusting the position at which at least one tail is laid on the rotating bale.

The method preferably includes guiding the delivery of film to the bale, supplying film to the guide means, and pivoting the plane of the film supplied to the guide means about an axis that is substantially parallel to the feed direction of the film in order to bundle the film. Advantageously, the plane of the film is pivoted through an angle of approximately 90°, or preferably more than 90°.

The method may includes rotating at least one film supply roll about a pivot axis that is substantially parallel to the feed direction of the film, for example by rotating at least one film supply roll about a pivot axis that is offset from the plane of the film. Advantageously, the film supply roll is rotated about the pivot axis through an angle in the range of approximately 5-15° in order to adjust the position at which the film is laid on the surface of the bale The method may include guiding the film with a guide means that includes at least one roller having a rotation axis that is substantially parallel to the rotation axis of the bale. The guide means is preferably separated from the supply of film material by a distance of approximately half the film width H.

Advantageously, the film strips are bundled by gathering together with guide means the opposed edges of each strip of binding film. Preferably, the positions of the guide elements are adjusted to control the separation of the edges. The positions of the guide elements may also be adjusted to control the position at which each strip of binding film is laid on the rotating bale.

The method preferably includes crinkling or folding back the edges of the combined film strip to provide additional support for the edges of the bale. Alternatively, the edges of the combined film strip can be wrapped around the ends of the bale to protect the end faces of the bale.

According to another aspect of the invention there is provided a baling machine including a bale making apparatus and a binding apparatus according to any one of the preceding statements of invention.

According to yet another aspect of the invention there is provided a method of baling, including forming a bale and binding the bale by a method according to any one of the preceding statements of invention.

Various embodiments of the present invention will now be described by way of example, with reference to the accompanying drawings, in which:

BRIEF DESCRIPTION OF THE DRAWINGS

FIG. 1b illustrates schematically the arrangement of the binding film around the circumference of a bale using the prior art binding process;

FIGS. 1c and 1d illustrate respectively the locations of the trailing and leading end tails on a bale that has been bound according to the prior art process;

FIG. 2a illustrates schematically the arrangement of the binding film around the circumference of a bale according to a first embodiment of the invention;

FIGS. 2b and 2c illustrate respectively the locations of the trailing and leading end tails on a bale according to the first embodiment of the invention;

FIG. 2d illustrates schematically the arrangement of the binding film around the circumference of a bale according to a second embodiment of the invention;

FIGS. 2e and 2f illustrate respectively the locations of the trailing and leading end tails on a bale according to the second embodiment;

FIGS. 3a and 3b illustrate schematically a binding apparatus according to a third embodiment of the invention, in first and second configurations;

FIGS. 3c and 3d illustrate schematically a binding apparatus according to a fourth embodiment of the invention, in first and second configurations;

FIG. 3h is a plan view of a feed mechanism for a binding apparatus according to a sixth embodiment of the invention;

FIG. 4b illustrates schematically the arrangement of the binding film around the circumference of a bale using a binding process according to a ninth embodiment of the invention;

FIGS. 4c and 4d illustrate respectively the location of the trailing and leading end tails on a bale according to the ninth embodiment;

FIG. 6b illustrates schematically the arrangement of the binding film around the circumference of a bale according to a twelfth embodiment;

FIG. 6c is a cross-section illustrating the arrangement of the binding film according to the twelfth embodiment;

FIGS. 6d and 6e illustrate respectively the locations of the trailing and leading end tails on a bale according to the twelfth embodiment;

DETAILED DESCRIPTION OF THE PREFERRED EMBODIMENT

FIGS. 1a to 1d illustrate schematically a prior art binding apparatus and process, for example as described in U.S. Pat. No. 6,971,220B (RPP). The binding film 2 for example of polyethylene is withdrawn from a supply roll 4 and fed onto the cylindrical surface 8 of a round bale 6 of straw or other crop material. The bale 6 rotates around its longitudinal axis in the direction of arrow A to draw the film 2 from the roll onto the cylindrical bale surface 8. The film 2 is self-adhesive or coated on one side with an adhesive so that it sticks to itself and to the surface of the bale. Enough layers of film are applied to the bale to bind it into a cylindrical shape and maintain the compression of the material forming the bale. Usually this requires three or four layers of film.

Figure 1A:
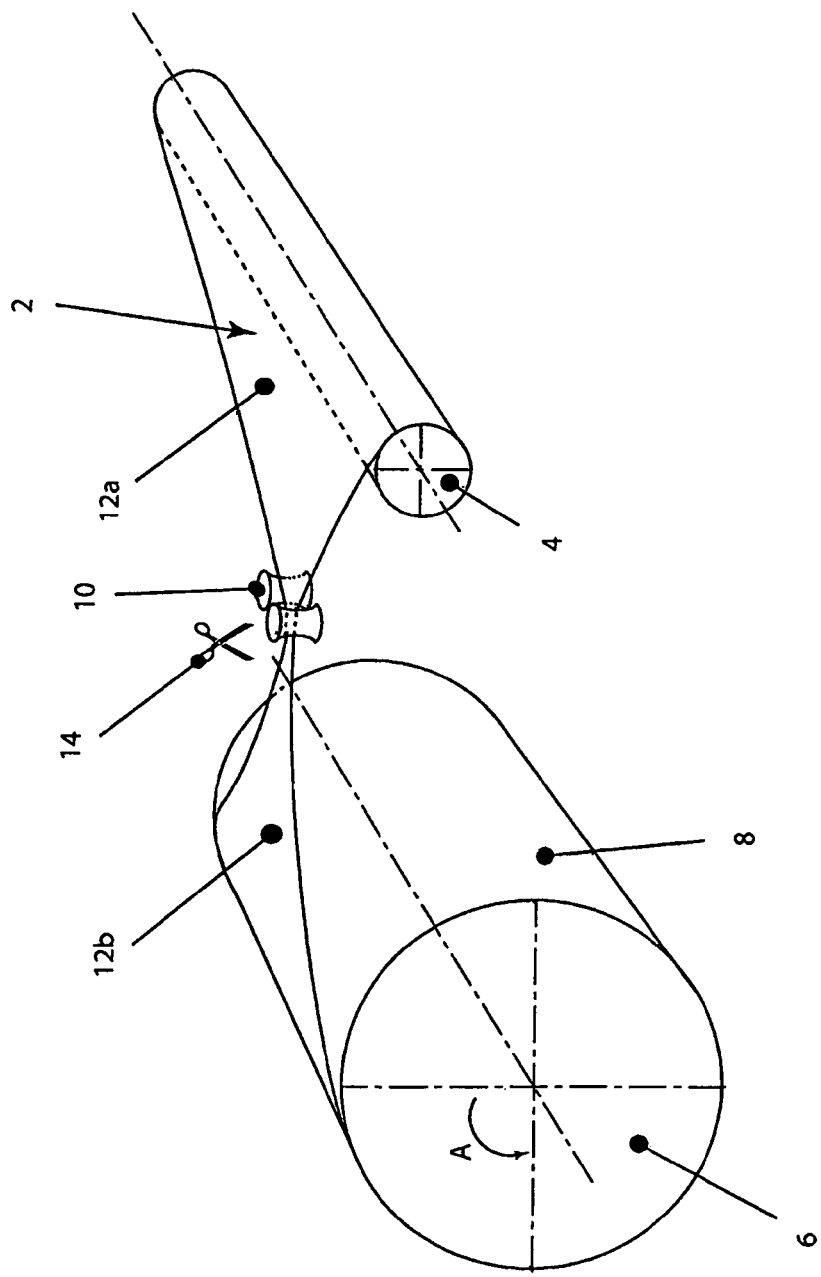
FIG. 1a is an isometric view showing schematically the main components of a prior art bale binding mechanism.

When binding of the bale has been completed, the edges of the film 2 are pressed towards one another by two side rollers 10 that can be displaced substantially transversely to the feed direction of the film 2. In FIG. 1a the side rollers 10 are shown in the displaced position in which the film 2 is bundled to form a rope. Alternatively, the side rollers can be moved apart allowing the film 2 to cover the entire width of the cylindrical bale surface 8.

It can be seen in FIG. 1a that the last part of the film 2 applied to the surface of the bale 6 forms a tapered trailing end tail 12b. After forming the tail 12b a cutter device 14 (shown only symbolically in FIG. 1a) cuts the film 2 to complete binding of the bale 6, which is then discharged from the baler.

The remaining cut end of the film 2 forms a leading end tail 12a, which is held between the side rollers 10 until the next bale has been formed. The leading end tail 12a is then fed by the side rollers 10 onto the cylindrical surface of the bale to start the next binding operation. Once the end of the tail 12a has been captured by the bale, the rollers 10 move apart allowing the film to stretch over the entire cylindrical surface of the bale. The process then continues as described above.

FIGS. 1b to 1d illustrate the prior art binding arrangement in which the film 2 is wound onto the surface of a bale 6 to form a binding layer 16. The leading end tail 12a (shown in broken lines) is covered by the layers of film applied subsequently to the bale, whereas the trailing end tail 12b is located on the outer surface of the binding layer 16.

In this example, the bale 6 has a width W and a circumference L. As illustrated in FIG. 1b, the leading end tail 12a and the trailing end tail 12b each extend around approximately half the circumference L of the bale. The total length of film used in forming the two tails 12a,12b is therefore approximately equal to the circumference L. For a bale with a diameter of 1.25 meters, this represents approximately 4 meters of film. This length of film does not bind the bale effectively as it does not extend across the entire width of the bale: from this point of view it may therefore be regarded as wasted film.

It should also be noted that the ends of the tails 12a,12b are located centrally between the ends of the bale 6. The central region of the bale is therefore covered by a larger number of film layers and will experience a greater degree of compression than the ends of the bale. This is undesirable as the shoulders of the bale (where the circumferential surface meets the end faces) are generally exposed to a higher level of wear during transportation and storage and therefore require a higher degree of protection.

FIGS. 2a to 2c illustrate a binding method according to a first embodiment of the invention. The bale 6 is wrapped using two separate strips of film material 2a,2b each of which preferably has a width of approximately or slightly greater than half the bale width W. The strips of film 2a,2b are arranged side-by-side parallel to one another on the cylindrical surface of the bale 6, to form the wrapping layer 16. Optionally, the strips 2a,2b are arranged to have a small overlap.

Each strip 2a,2b has a leading end tail 12a and a trailing end tail 12b. The taper angles of these tails are the same as the taper angles of the prior art examples shown in FIGS. 1b,1d. However, as the width of each strip is only approximately ½ W, the length of each tail is only approximately ¼ L. Therefore, the length of film used to form the tails is only approximately half of the length used in the prior art. The invention therefore provides a significant saving in film consumption.

It will also be noted that the ends of the tails 12a,12b are located at a distance of approximately ¼ W from the edges of the bale 6. The method thus provides a more even wrapping layer 16 on the surface of the bale 6 than the prior art method shown in FIGS. 1b to 1d.

FIGS. 2d to 2f illustrate a binding method according to a second embodiment of the invention. The bale 6 is wrapped in two strips of film material 2a,2b each of which has a width of approximately, or slightly greater than, half the bale width W. The strips of film 2a,2b are arranged side-by-side parallel to one another on the cylindrical surface of the bale 6, preferably with a small overlap, to form the wrapping layer 16.

Each strip 2a,2b has a leading end tail 12a and a trailing end tail 12b. As in the previous embodiment, the length of each tail is approximately ¼ L.

In this embodiment, the leading end tails 12a and the trailing end tails 12b each taper outwards towards the edges of the cylindrical bale surface. As a result, in the completed wrapping layer 16 more of the binding material is located towards the edges of the cylindrical surface than in the centre of the surface. This increases the compression of the bale near the edges of the bale and provides additional protection for the vulnerable shoulders of the bale 6 over at least part of the bale's circumference.

It may be noted that although the leading end and trailing end tails 12a,12b both taper towards the edges of the cylindrical bale surface, the points of the tales are set back slightly from the extreme edges of the cylindrical surface in order to reduce the risk of the tail ends being freed by abrasion with other surfaces during transportation or storage.

A binding apparatus for implementing a binding method according to an embodiment of the invention is shown schematically in FIGS. 3a and 3b. The binding apparatus includes two supply rolls of film 4a,4b that in the configuration of FIG. 3a are arranged with their longitudinal axes substantially parallel but preferably slight displaced from one another, so as to allow strips of film material 2a,2b withdrawn from the rolls to overlap slightly, if required. The supply rolls 4a,4b are shown only schematically in the drawings: it should be understood that each of these supply rolls 4a,4b may optionally include a pre-stretching unit, for example of the type shown in FIGS. 3i,3j.

The strips of film 2a,2b withdrawn from the supply rolls 4a,4b are fed by a pair of parallel feed rollers 18 onto the cylindrical surface of a round bale 6, to form a binding layer 16. The other parts of the baling machine, including for example the chamber in which the bale is formed and the mechanism for rotating the bale within the chamber, are conventional and have therefore been omitted from the drawings for clarity. The feed rollers 18 may also be part of a conventional net feeding mechanism, in which case the mechanism can be used for feeding either net or film.

Each of the film supply rolls 4a,4b is mounted for rotation about a pivot axis 20a,20b that is substantially parallel to the feed direction of the film. In this embodiment, each pivot axis 20a,20b also lies substantially in the plane of the film as it is drawn from the supply roll 4a,4b. Each supply roll 4a,4b can be rotated about the respective pivot axis 20a,20b through an angle of approximately 90° from the horizontal orientation shown in FIG. 3a to the vertical orientation shown FIG. 3b. Rotating the supply rolls 4a,4b to the vertical position causes the film strips 2a,2b to gather into bundles 2a',2b' at the point where they are drawn between the feed rollers 18. This is illustrated in FIG. 3b. The need for a separate bundling mechanism as provided for example by the side rollers 10 in the prior art apparatus of FIG. 1a is thus avoided. Further, the inventors have discovered that bundling the film in this way produces a more even bundle, as the film tends to fold upon itself in concertina fashion as it approaches and passes through the feed rollers 18.

The apparatus shown in FIGS. 3a and 3b also includes a cutting mechanism 14, which is conventional and is shown only symbolically in the drawings. After the film has been cut, the trailing end tails 12b are wrapped onto the cylindrical surface of the bale 6 and the bale is then discharged from the baling machine. The baling operation then starts again and once a new bale has been formed in the baling chamber, the bundled ends 2a',2b' of the film material are fed by the feed rollers 18 onto the cylindrical surface of the bale to start a new binding operation. As soon as feeding of the film has commenced, the supply rolls 4a,4b rotate from the vertical orientation shown in FIG. 3b back to the horizontal orientation shown in FIG. 3a so that the strips of film 2a,2b expand back to their full width in order to bind the bale. The operation then continues as described above.

FIGS. 3c and 3d illustrate a modification to the binding apparatus shown in FIGS. 3a and 3b, in which the parallel feed rollers 18 are each provided with recessed portions 22 that accommodate the bundled film 2a',2b' when the supply rolls 4a,4b are in the vertical orientation as shown in FIG. 3d. This helps to compact and shape the bundled film, to ensure that it is fed correctly onto the surface of the rotating bale 6.

In each of the embodiments shown in FIGS. 3a,3b and FIGS. 3c,3d, the supply rolls 4a,4b can if required be arranged to rotate through slightly more than 90° from the horizontal position to a position slightly beyond the vertical position. This can help to bundle the film more quickly and ensures that the adhesive, surface of the film in the bundles is fully covered, so that a sticky surface is not left exposed on the surface of the bale.

Figure 3E:
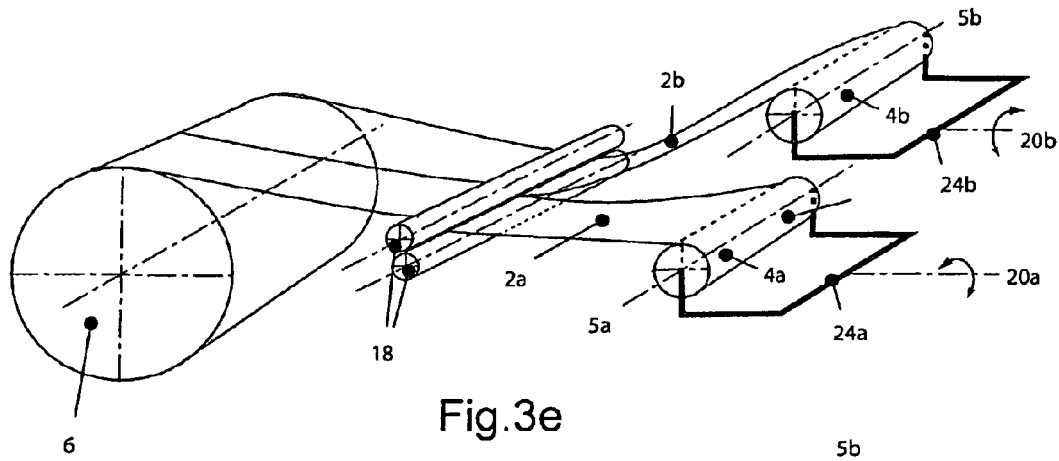
FIGS. 3e, 3f and 3g illustrate schematically a binding apparatus according to a fifth embodiment of the invention, in first, second and third configurations.
Figure 3F:
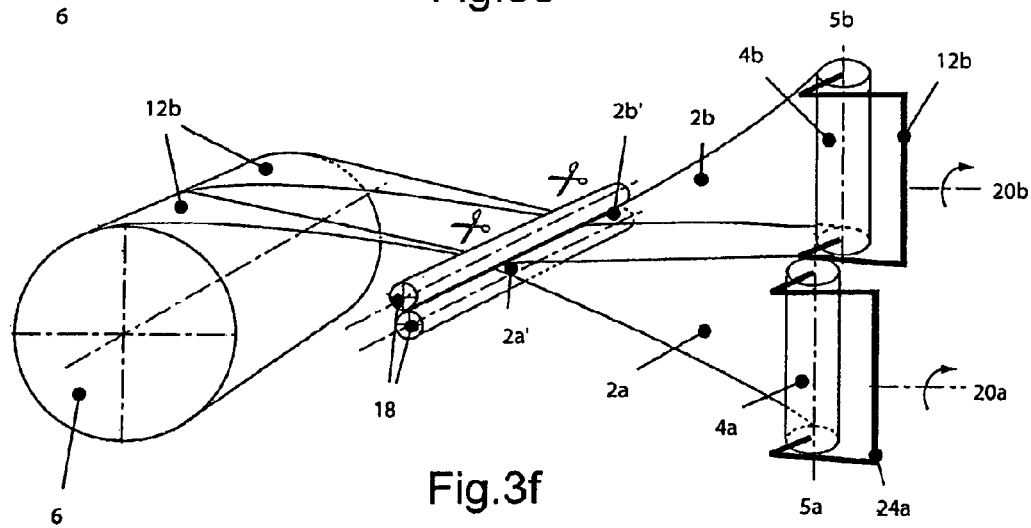
Figure 3G:
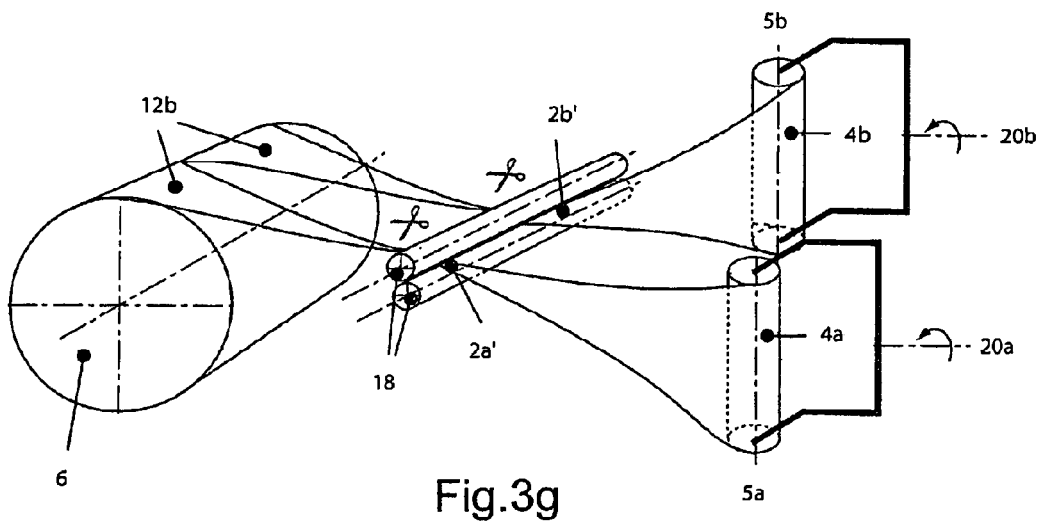

Another modification to the apparatus of FIGS. 3a and 3b is shown in FIGS. 3e to 3g. In this embodiment the supply rolls 4a,4b are mounted on supports 24a,24b, each support being mounted for rotation about the respective pivot axis 20a,20b. Each support 24a,24b supports the respective supply roll 4a,4b in a position such that the pivot axis 20a,20b is displaced from the feed plane of the film as it is drawn from the supply roll. As a result, when the supply rolls 4a,4b are in the horizontal orientation shown in FIG. 3e, the feed plane of each strip of film is located above the respective pivot axes 20a,20b, whereas when the supply rolls 4a,4b are in a vertical orientation as shown in FIG. 3f and FIG. 3g, the feed plane of each strip of film is displaced horizontally from the vertical plane of the respective pivot axis 20a,20b.

The consequence of providing offset pivot axes can be seen in FIGS. 3f and 3g. In FIG. 3f the supply rolls 4a,4b are shown rotated through 90° from the horizontal orientation to a clockwise rotated vertical position (as seen in the direction of film travel). As a result of the offset pivot axes, the supply rolls 4a,4b are displaced to the right of the pivot axes 20a,20b, and the bundled film strips 20a',20b' are displaced somewhat towards the right hand end of the feed rollers 18. Conversely, when the supply rolls 4a,4b are rotated anticlockwise to the vertical position shown in FIG. 3g, the supply rolls 4a,4b are displaced to the left of the pivot axes 20a,20b and the bundled film strips 2a',2b' are displaced towards the left hand end of the feed rollers 18. This allows the leading end and trailing end tails 12a,12b to be displaced towards one or other end of the bale 6.

Alternatively, if the supply rolls 4a,4b are pivoted in opposite directions, the tails of the film can be displaced in opposite directions, so that they are located near opposite ends of the bale, or are both located towards the centre of the bale. The apparatus thus allows the position of the leading end and trailing end tails 12a,12b on the cylindrical surface of the bale to be controlled. The tails can therefore be located centrally, for example as shown in FIGS. 2a to 2c, or in offset positions as shown in FIGS. 2d to 2f.

Furthermore, if the supply rolls 4a,4b are rotated from the horizontal orientation through a small angle, for example about 5° to 15°, the position of each film strip 2a,2b on the surface of the bale can be adjusted in the direction of the bale axis without causing significant bundling of the film. It is thus possible to adjust the overlap between the two strips of film or the degree of overlap of each strip with the respective bale end. In this way, the degree of binding at the bale ends can be controlled and increased if required. This may be important when the width of the film strips varies, for example as a result of changes in the physical properties of the film or in the ambient temperature, which can effect the amount of "necking" in the film as it is stretched. longitudinally FIG. 3h illustrates another modification of the apparatus shown in FIGS. 3a and 3b, in which an additional bundling roller 26 is provided in the film path between the supply roll 4a and the feed rollers 18. Only one supply roll 4a is shown in the drawing: the other supply roll 4b either uses the same bundling roller or has a similar bundling roller.

The axis of the bundling roller 26 is parallel to the axes of the feed rollers 18 and, therefore, is perpendicular to the plane of the film 2a as it is withdrawn from the supply roll 4a, when the roll is in the vertical orientation as shown FIG. 3h. This causes the film to crease and fold as it approaches and passes around the bundling roller 26, to form a neat bundle 2a'. The bundle 2a' is then fed onto the surface of the bale by the feed rollers 18.

In this example, the strip of film 2a supplied from the supply roll 4a has a width H and the distance from the centre of the bundling roller 26 to the axis 5a of the supply roll 4a is approximately ½ H. The inventors have found that this ratio of film width to separation distance provides an excellent bundling effect.

Figure 3I:
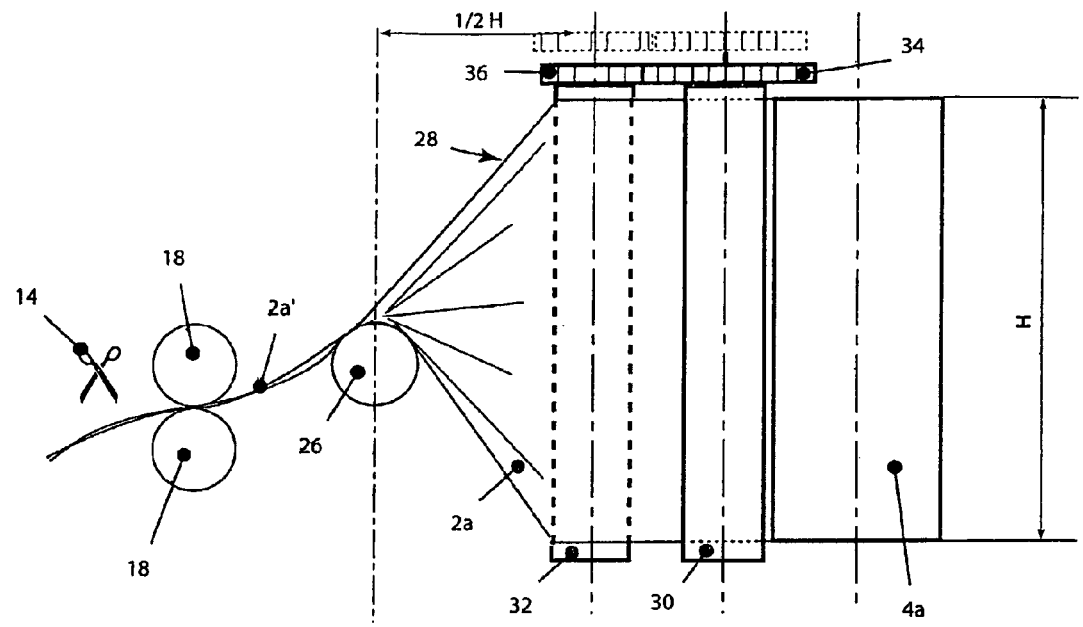
FIGS. 3i and 3j are respectively a plan view and a side view of a feed mechanism for a binding apparatus according to a seventh embodiment of the invention.
Figure 3J:
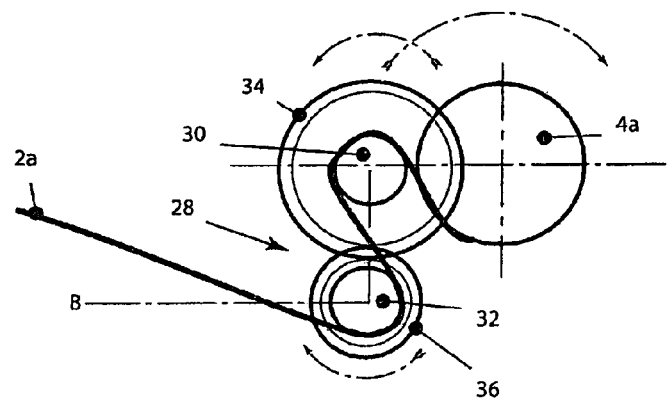

FIGS. 3i and 3j illustrate a modified form of the binding apparatus shown in FIG. 3h. In this embodiment, the binding apparatus includes a pre-stretching unit 28 that is located between the supply roll 4a and the bundling roller 26. Alternatively, if the bundling roller 26 is omitted, the pre-stretching unit 28 may be located between the supply roll 4a and the feed rollers 18. The pre-stretching unit 28 includes a pair of counter-rotating rollers 30,32 which are connected by gears 34,36 that cause the second roller 32 to rotate at a higher circumferential speed than the first roller 30. Therefore, as the film passes around these rollers, it undergoes a stretching process. In this arrangement, the separation distance is measured from the centre of the bundling roller 26 to the axis of the second roller 32 of the pre-stretching unit 28. Again, the ideal separation distance is approximately ¼ H.

Figure 4A:
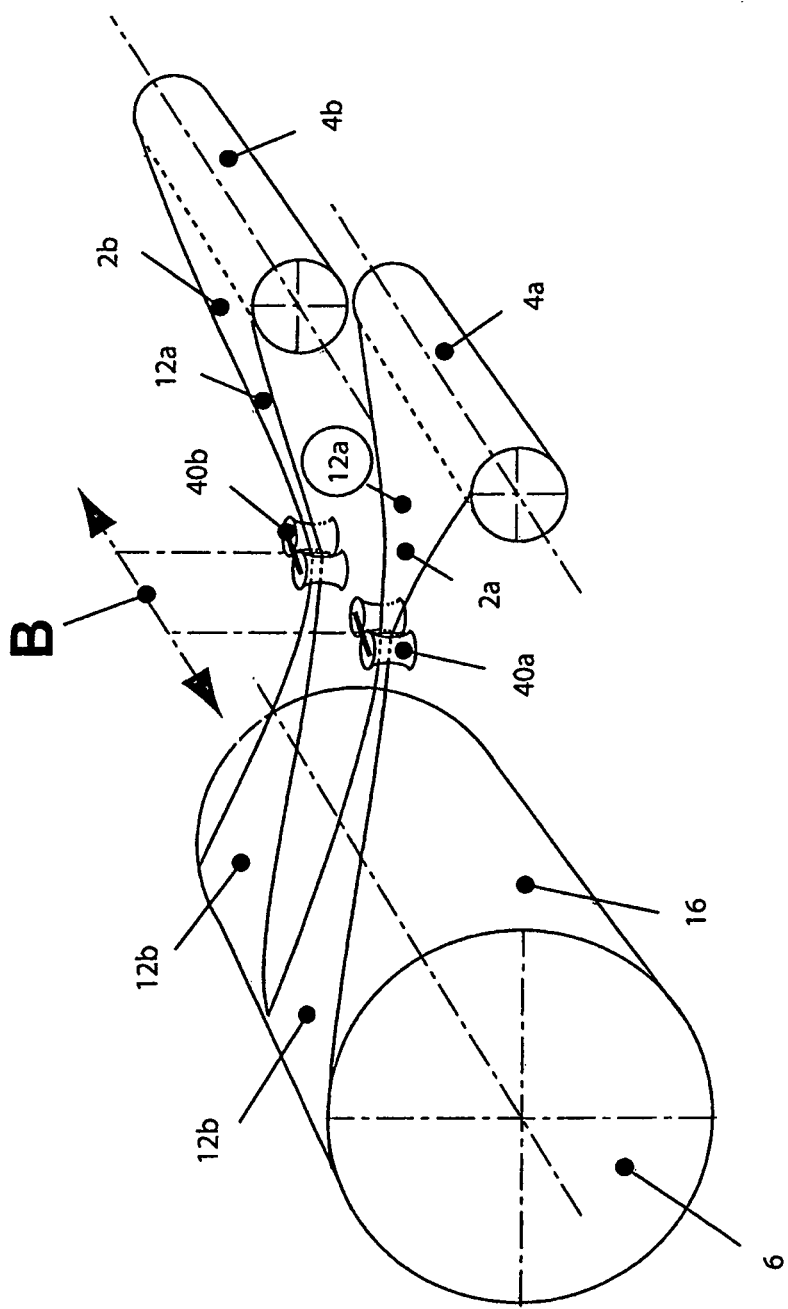
FIG. 4a is an isometric view illustrating schematically a binding apparatus according to an eighth embodiment of the invention.

FIG. 4a illustrates schematically another form of the apparatus, in which the bundling apparatus comprises two pairs of side rollers 40a,40b. The two rollers of each pair can be moved apart or together to the position shown in the drawing, in order to form each strip of film 2a,2b into a bundle. To this end, the side rollers may for example be mounted on pivoting arms (not shown) as described in U.S. Pat. No. 6,971,220B (RPP), or on a slide mechanism (not shown).

In addition, each pair of side rollers 40a,40b can be displaced sideways in a direction transverse to the film feed direction, as indicated by arrow B. This allows the side rollers 40a,40b to guide the position at which the leading end and trailing end tails 12a,12b are laid down on the cylindrical surface of the bale. This movement of the two pairs of side rollers 40a,40b may be interlinked so that both pairs of side rollers 40a,40b move in the same way, or it can be independent so that the side rollers 40a,40b move in different directions or at different speeds. This allows the binding apparatus to generate different film binding patterns, for example as depicted in FIGS. 2a to 2f.

Some additional film binding patterns are illustrated in FIGS. 4b to 4d, 4e and 4f, and 5a to 5d. In the embodiment shown in FIGS. 4b to 4d, the leading end tails 12a and the trailing end tails 12b are laid down asymmetrically, the leading end tails 12a being displaced towards the right hand end of the bale whereas the trailing end tails 12b are displaced towards the left hand end of the bale. In each case, the end of the tail is positioned at a distance of approximately ⅙ W from one edge of the respective strip of film and at a distance of approximately ⅓ W from the other edge of the strip.

Figure 4F:
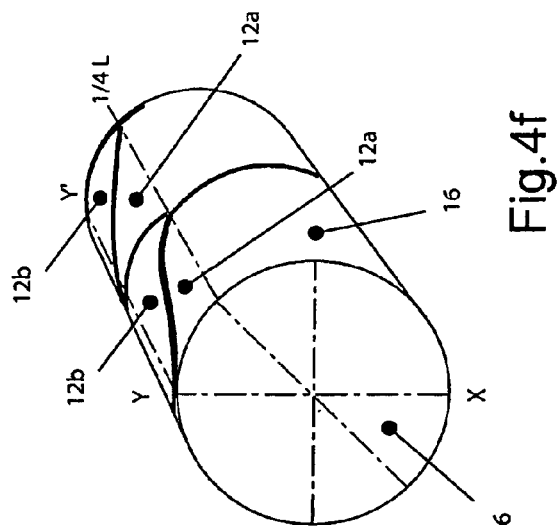
FIG. 4f illustrates the locations of the trailing and leading end tails on a bale according to the tenth embodiment.
Figure 4E:
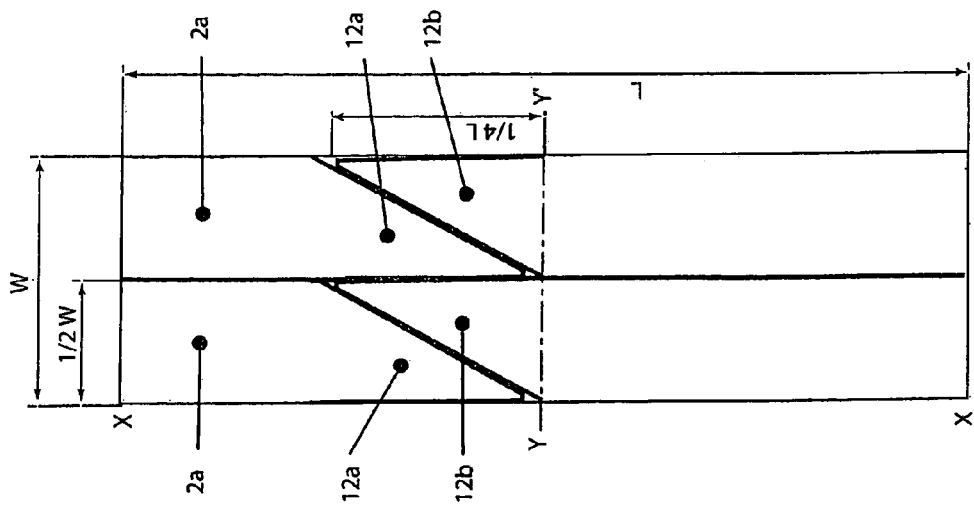
FIG. 4e illustrates schematically the arrangement of the binding film around the circumference of a bale according to a tenth embodiment of the invention.
Figure 5A:
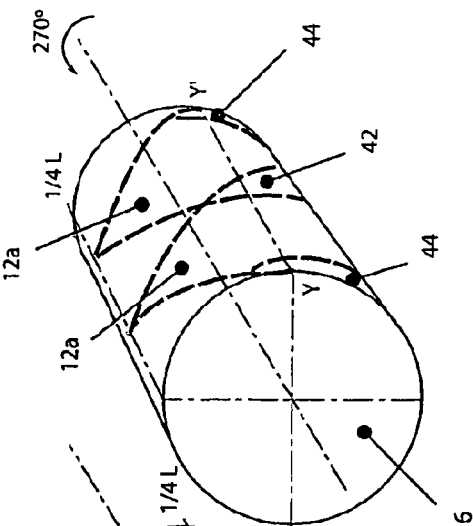
FIG. 5a illustrates schematically the arrangement of the binding film around the circumference of a bale according to an eleventh embodiment of the invention.
Figure 5B:
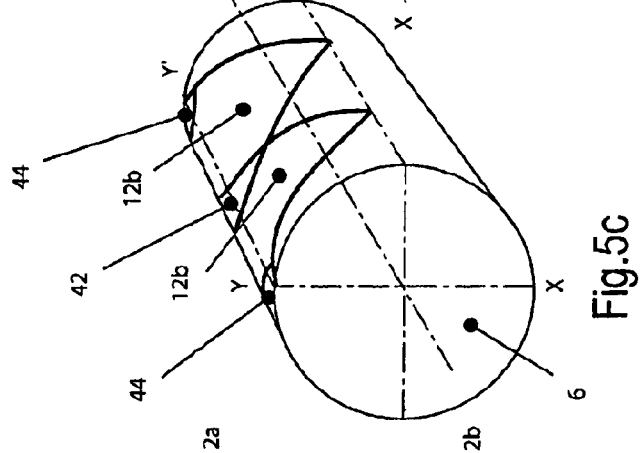
FIG. 5b is an end view of the binding film according to the eleventh embodiment.
Figure 5C:
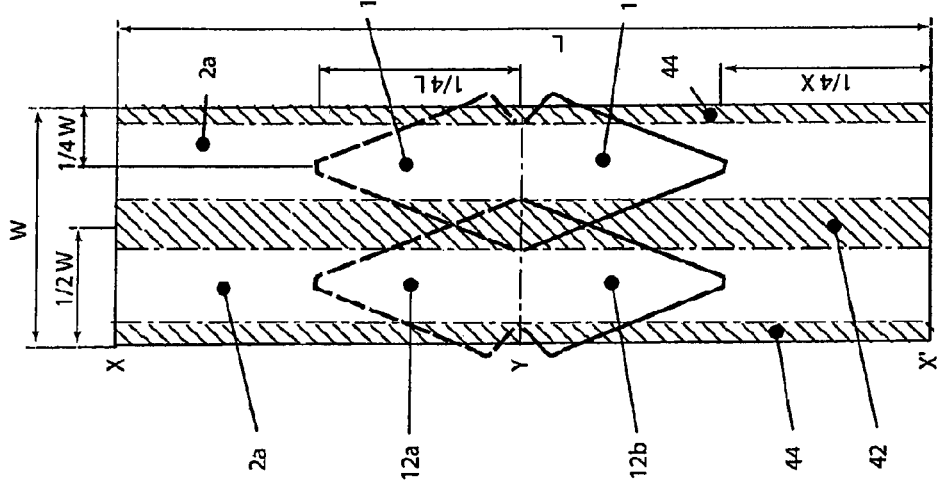
FIGS. 5c and 5d illustrate respectively the locations of the trailing and leading end tails on a bale according to the eleventh embodiment.
Figure 5D:
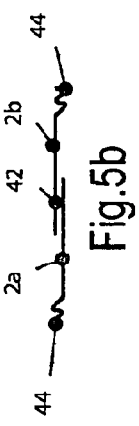

FIGS. 4e and 4f illustrate another asymmetric binding pattern, in which the leading end tails 12a and the trailing end tail's 12b are located towards opposite edges of the respective strip of film material. An interleaving pattern is thus formed, with the result that the film layer 16 has a substantially uniform thickness.

In FIGS. 5a to 5d, each strip of film 2a,2b has a width that is slightly greater than ½ W. The strips are laid down on the cylindrical surface of the bale 6 so that they overlap in an overlapping region 42 in the centre of the bale. The outer edges of each strip of film 12a,12b are forced inwards by a deflector plate (not shown) with the result that the outer parts of the binding layer form crinkled regions 44 adjacent the ends of the bale 6. These crinkled regions 44 provide additional protection for the vulnerable shoulders of the bale.

Alternatively, the outer edges of each strip of film 12a,12b may be folded back onto themselves to provide additional protection for the vulnerable shoulders of the bale, or allowed to overlap the ends of the bale 6 to provide additional protection for the end faces of the bale.

Figure 6A:
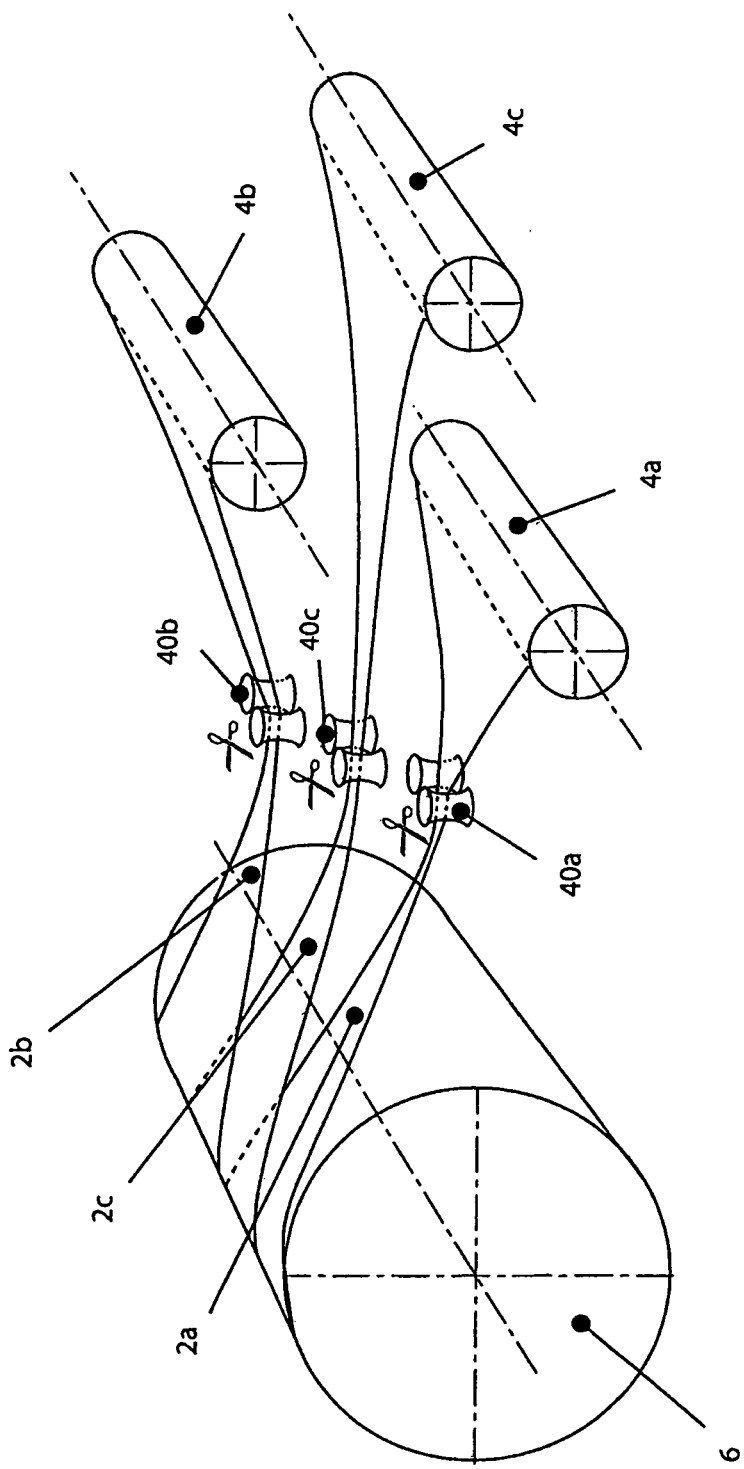
FIG. 6a is an isometric view illustrating schematically a binding apparatus according to a twelfth embodiment of the invention.

FIG. 6a illustrates a modification of the apparatus shown in FIG. 4a, in which three film supply rolls 4a,4b,4c are provided instead of the two rolls of the previous arrangement. Three strips of film material 2a,2b,2c are thus applied to the cylindrical surface of the bale 6. In this embodiment, the bundling mechanism comprises three sets of side rollers 40a, 40b,40c. It will be appreciated however that bundling could also be achieved by rotating the supply rolls 4a,4b,4c about pivot axes as shown in the embodiment of FIGS. 3a,3b.

An example of a binding pattern that can be achieved using the apparatus of FIG. 6a is illustrated in FIGS. 6b to 6e. In this case, the three strips of film material 2a,2b,2c are laid down with a considerable degree of overlap, as can be seen clearly in FIG. 6c. In this example, the leading end tails 12a and the trailing end tails 12b are formed symmetrically, the ends of the two outer pairs of tails being located at a distance of approximately ¼ W from the edge of the bale 6.

Figure 6F:
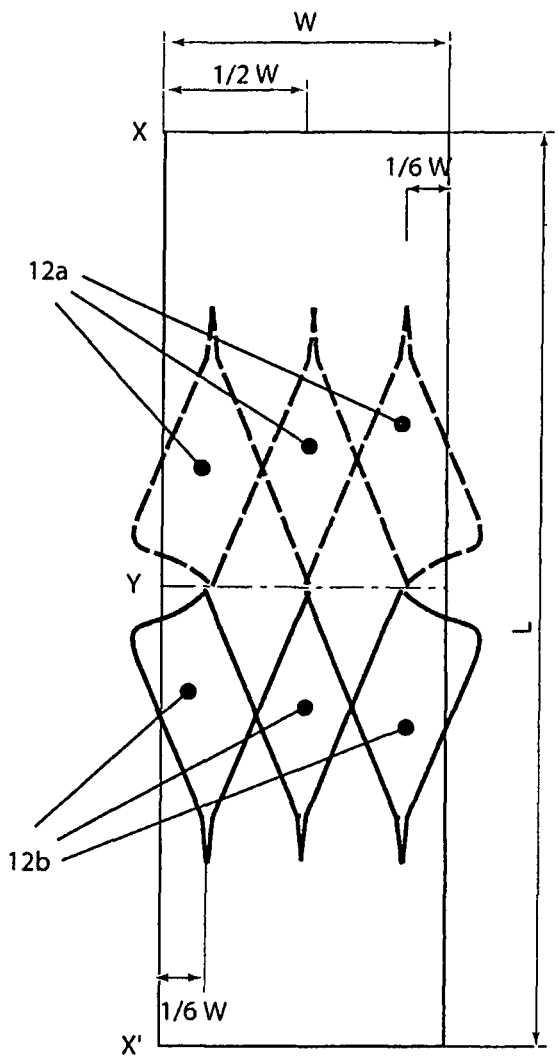
FIG. 6f illustrates schematically the arrangement of the binding film around the circumference of a bale bound according to a thirteenth embodiment of the invention.
Figure 6G:
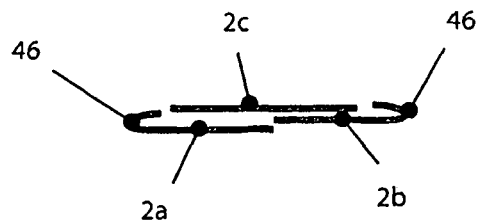
FIG. 6g is a cross-section showing the arrangement of the film in the thirteenth embodiment.

FIGS. 6f and 6g illustrate yet another possible binding pattern, in which the width of each of the three strips of film material 2a,2b,2c is increased to provide a greater degree of overlap between the adjacent strips and also an additional portion of strip material adjacent each edge of the bale, which is folded back to form a folded portion 46 adjacent each edge of the bale. This folded portion 46 also serves to protect the vulnerable shoulders of the bale.

In the example of FIGS. 6f and 6g, each strip of film material 2a,2b,2c has a width of approximately ⅔ W. Therefore the combined total width of the three film strips is about 2 W, or twice the bale width. As a result, for each rotation of the bale a double thickness of film material is applied to the surface of the bale. This allows the film thickness required to achieve satisfactory binding of the bale to be achieved in fewer rotations of the bale, providing a time saving.

The binding apparatus described herein can be implemented either in a stand-alone baler or in a combined baler/wrapper. It can also be provided as a separate binding mechanism for retro-fitting to an existing baler or baler/wrapper. In this case, the binding apparatus may utilise certain parts of an existing binding apparatus, for example the net feeding rollers of a net binding apparatus. The terms "baler" and "baling machine" as used herein are intended to encompass both stand-alone balers and combined baler/wrapper machines.

Various other modifications of the apparatus are also possible: for example instead of using feed rollers 18, other types of feed mechanism may be used, such a guiding/holding device as described for example in U.S. Pat. No. 5,855,109.

What is claimed is:

1. A binding apparatus for a baling machine, the apparatus comprising a dispensing mechanism for dispensing at least two strips of binding film and guiding the strips of film simultaneously onto the surface of a rotating bale, the dispensing mechanism being constructed and arranged to lay the strips of film side-by-side on the bale surface to form a combined strip having a width greater than the width H of each individual strip of binding film and approximately equal to the bale width W, the dispensing mechanism further comprising means for bundling each strip of binding film to form a tail having a reduced width, guide means for guiding the delivery of film to the bale and supply means for supplying film to the means, wherein the bundling means includes means for pivoting the plane of the film supplied to the guide means about an axis that is substantially parallel to the feed direction of the film, said means for pivoting the plane of the film comprising means for rotating at least one film supply roll about a pivot axis that is substantially parallel to the feed direction of the film.

2. The binding apparatus according to claim 1, further comprising means for adjusting the position at which at least one strip of binding film is laid on the rotating bale.

3. The binding apparatus according to claim 1, further comprising means for adjusting the position at which at least one tail is laid on the rotating bale.

4. The binding apparatus according to claim 1, wherein the pivot axis is offset from the plane of the film supplied to the guide means.

5. The binding apparatus according to claim 1, wherein the guide means comprises at least one roller having a rotation axis that is substantially parallel to the rotation axis of the bale.

6. The binding apparatus according to claim 5, wherein the guide means further comprises at least two counter-rotating rollers, each having a rotation axis that is substantially parallel to the rotation axis of the bale.

7. The binding apparatus according to claim 6, wherein at least one of the rollers includes a recess for guiding the bundled film.

8. The binding apparatus according to claim 1, wherein the guide means is separated from the supply of film material by a distance of approximately half the film width H.

9. The binding apparatus according to claim 1, wherein the bundling means comprises guide elements for gathering together the opposed edges of at least one strip of binding film.

10. The binding apparatus according to claim 9, wherein the positions of the guide elements are adjustable to control the separation of the edges.

11. The binding apparatus according to claim 9, wherein the positions of the guide elements are adjustable to control the position at which the strip of binding film is laid on the rotating bale.

12. The binding apparatus according to claim 1, further comprising a pre-stretching device for stretching the film after it is drawn from the supply rolls.

13. A baling machine including a bale making apparatus and a binding apparatus according to claim 1.

14. A method of binding a bale, the method comprising dispensing at least two strips of binding film and guiding the strips of film simultaneously onto the surface of a rotating bale, the strips of film being laid side-by-side on the bale surface to form a combined strip having a width greater than the width H of each individual strip of binding film and approximately equal to the bale width W, and bundling each strip of binding film by pivoting the plane of the film about an axis that is substantially parallel to the feed direction of the film, to form a tail having a reduced width, wherein the plane of the film is pivoted by rotating at least one film supply roll about a pivot axis that is substantially parallel to the feed direction of the film.

15. The method according to claim 14, further comprising adjusting the position at which at least one strip of binding film is laid on the rotating bale.

16. The method according to claim 14, further comprising adjusting the position at which at least one tail is laid on the rotating bale.

17. The method according to claim 14, wherein the plane of the film is pivoted through an angle of approximately 90°.

18. The method according to claim 14, further comprising rotating at least one film supply roll about a pivot axis that is offset from the plane of the film.

19. The method according to claim 18, further comprising rotating at least one film supply roll about a pivot axis through an angle in the range of approximately 5-15° in order to adjust the position at which the film is laid on the surface of the bale.

20. The method according to claim 14, further comprising guiding the film with a guide means that includes at least one roller having a rotation axis that is substantially parallel to the rotation axis of the bale.

21. The method according to claim 20, wherein the guide means is separated from the supply of film material by a distance of approximately half the film width H.

22. The method according to claim 14, wherein at least one strip of binding film is bundled by gathering together with guide means the opposed edges of the strip.

23. The method according to claim 22, further comprising adjusting the positions of the guide means to control the separation of the edges.

24. The method according to claim 22, further comprising adjusting the positions of the guide means to control the position at which the strip of binding film is laid on the rotating bale.

25. The method according to claim 14, further comprising crinkling or folding back at least one edge of the combined strip to provide additional support for an edge of the bale.

26. The method according to claim 14, wherein the plane of the film is pivoted through an angle of more than 90°.

27. A method of baling, comprising forming a bale and binding the bale by a method according to claim 14.

* * * * *